Patented Oct. 7, 1930

1,777,548

UNITED STATES PATENT OFFICE

CHARLES F. BOOTH, OF ANNISTON, ALABAMA, ASSIGNOR, BY MESNE ASSIGNMENTS, TO SWANN RESEARCH, INC., OF BIRMINGHAM, ALABAMA, A CORPORATION OF ALABAMA

PROCESS FOR THE TREATMENT OF PHOSPHORIC ACID

No Drawing.   Application filed March 19, 1928. Serial No. 262,997.

This invention relates to a method for the treatment of concentrated phosphoric acid whereby sediment which normally is present may be settled in a manner as to aid in the purification of such acid. The invention relates particularly to the treatment of phosphoric acid obtained from smelting processes in which concentrated acid is produced.

The principal object of the invention is to shorten the time necessary for the acid to remain in settling tanks, before filtering, to remove sediment which remains in suspension after such periods of settling. Further objects are to improve the rate of filtration and increase the quantity of acid which may be obtained in suitable form for filtration as a result of treatment hereinafter described.

When concentrated phosphoric acid is obtained by smelting methods, as for instance by electric furnace smelting of phosphate rock, coke, silica, etc., similar to that which is described in U. S. Patent No. 1,410,550, a sediment frequently is found in such acid which frequently presents great difficulty in its removal. Clear acid is necessary for a great many chemical and industrial uses, and it is toward the improvement of the process for the production of such acid, that this invention is particularly directed. The sediment, which occurs in acid as it is collected from phosphate rock smelting operations, varies in composition. In addition to other constituents, it is largely a compound or compounds of silicon and phosphorus, presumably in some oxidized form, and probably as a combination of silica ($SiO_2$) and phosphorus pentoxide ($P_2O_5$). This sediment may be carried into the acid as dust particles from the charge, or it may be formed from gases or vapors. The exact manner of its formation is not clearly understood. Further, this sediment seems to be of a colloidal nature.

Phosphoric acid as is ordinarily collected from phosphate rock smelting operations contains more than 75% $H_3PO_4$, and has a specific gravity exceeding 1.61. It is therefore apparent that the viscosity of such acid is appreciable, and under most favorable conditions there would be some difficulty in settling of sediment which is present, and precipitates which are formed during treatment for the removal of dissolved impurities.

Treatment for purification of such concentrated phosphoric acid is largely for the removal of lime, lead, arsenic, and fluorine which comprise the chief impurities. The removal of these impurities is accomplished by precipitation with sufuric acid, hydrogen-sulfide, and sodium silicate, in the manner described in U. S. Patent No. 1,538,089.

It frequently occurs that when the above mentioned purification steps are used, that the precipitate and sediment in the acid does not settle satisfactorily. Further, in such cases, if attempts are made to remove the sediment by filtration, the rate of filtration is very slow, and in some cases it is not at all possible to filter the acid.

As a result of a great many experiments which I have conducted, I believe that the sediment occurring in the acid carries a positive electrostatic charge, and I have found means whereby rapid settling may be effected. I have found that by adding very small quantities of bromine or albumen, I am enabled to greatly increase the rate of settling; however, it is undesirable to add either of the above substances because of objection to their presence in the acid intended for certain uses. It is to be noted that both of these substances would carry a negative charge, and in view of my theory it is to be expected these additions would aid in settling the acid.

I have discovered other means whereby the sediment may be caused to settle quickly, and at the same time not affect the quality of the acid for any purpose for which it may be subsequently desired. This treatment of the phosphoric acid, consists in the addition of precipitated arsenic sulfide, or the addition of arsenic compounds in definite quantities and the subsequent precipitation therein as arsenic sulfide. This addition may be made by several means, and the following is the method which I preferably employ.

In carrying out my improved process, I first form a treatment batch as follows:—

Arsenious oxide is dissolved in a 10% caustic soda solution, which is then added to clear concentrated phosphoric acid, until the acid contains approximately 0.0159 lbs. of $As_2O_3$ per pound of phosphoric acid. Hydrogen sulfide is then passed into this mixture until approximately 90% of the arsenic is precipitated as arsenic sulfide. The precipitated arsenic sulphide is kept in suspension by agitation. This treatment batch is then added to the phosphoric acid to be treated and which contains sediment, until approximately 200 to 400 parts per million arsenic are present in the acid being treated. The sediment carrying phosphoric acid being treated should be hot—approximately 100° C.—and should be saturated with hydrogen sulfide at the time the treatment batch of arsenic bearing acid is added. After the addition of the arsenic bearing phosphoric acid, the mixture is thoroughly agitated and then allowed to stand in a settling tank when the solid matter settles. Acid which has been treated in the foregoing manner, if stored in moderate size tanks, will be sufficiently settled within 48 hours to permit being drawn off from the sediment.

It is possible to add arsenious oxide to a tank of acid which contains sediment and precipitate the arsenic therein by means of hydrogen sulfide. In such case the arsenic should be added in such quantities as will give approximately 200 to 400 parts per million, and the phosphoric acid should be hot when the hydrogen sulfide is added. This method is not regarded as effective as the example cited. Further, while it is possible to add water soluble sulfide, as sodium sulfide for instance, and obtain an improvement in the rate of settling, this is not considered as satisfactory as the addition of hydrogen sulfide.

While I do not understand all the causes for the sediment in the acid not settling, nor the reactions involved in facilitating settling, I have demonstrated the practicability of my method of treatment.

What I claim is:

1. An improvement in the method of treatment of concentrated phosphoric acid, which comprises saturating said phosphoric acid with hydrogen sulfide, and the addition of arsenic sulfide thereto, substantially as described.

2. An improvement in the method of treatment of concentrated phosphoric acid, which comprises, heating said phosphoric acid, then saturating said phosphoric acid with hydrogen sulfide, and adding phosphoric acid bearing arsenic sulfide thereto, substantially as described.

3. An improvement in the method of treatment of concentrated phosphoric acid, which comprises heating said phosphoric acid, then saturating said phosphoric acid with hydrogen sulfide, and adding phosphoric acid bearing arsenic sulfide thereto in quantities exceeding 200 parts per million, substantially as described.

4. The herein described method of treating concentrated phosphoric acid which comprises, heating phosphoric acid exceeding 75% $H_3PO_4$, saturating said phosphoric acid with hydrogen sulfide, and adding phosphoric acid bearing arsenic sulfide thereto in excess of 200 parts per million, substantially as described.

5. The method of clarifying sediment bearing phosphoric acid which comprises forming a treatment batch consisting of an arsenic sulphide slurry precipitated in phosphoric acid, saturating the acid to be treated with hydrogen sulphide, and adding the slurry to the acid to be treated until said acid contains from 200 to 400 parts of arsenic per million.

6. The method of clarifying sediment bearing phosphoric acid which comprises forming a treatment batch consisting of an arsenic sulphide slurry precipitated in phosphoric acid, saturating the acid to be treated with hydrogen sulphide, and adding the slurry to the acid to be treated until said acid contains from 200 to 400 parts of arsenic per million, the acid under treatment being heated to approximately 100° C.

7. The method of clarifying sediment bearing phosphoric acid which comprises forming a treatment batch consisting of an arsenic sulphide slurry precipitated in phosphoric acid, saturating the acid to be treated with hydrogen sulphide, adding the slurry to the acid to be treated until said acid contains from 200 to 400 parts of arsenic per million, the acid under treatment being heated to approximately 100° C., agitating the acid, and allowing the arsenic sulphide with the sediment to settle.

In testimony whereof I affix my signature.

CHARLES F. BOOTH.